US008290219B2

(12) United States Patent
Connell et al.

(10) Patent No.: US 8,290,219 B2
(45) Date of Patent: Oct. 16, 2012

(54) REGISTRATION-FREE TRANSFORMS FOR CANCELABLE IRIS BIOMETRICS

(75) Inventors: Jonathan H. Connell, Cortlandt-Manor, NY (US); Nalini K. Ratha, Yorktown Heights, NY (US); Jinyu Zuo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 12/196,409

(22) Filed: Aug. 22, 2008

(65) Prior Publication Data

US 2010/0046805 A1 Feb. 25, 2010

(51) Int. Cl.
 *G06K 9/00* (2006.01)
(52) U.S. Cl. ...................................................... 382/117
(58) Field of Classification Search .................... 382/117
 See application file for complete search history.

(56) References Cited

U.S. PATENT DOCUMENTS

| 4,641,349 | A * | 2/1987 | Flom et al. | 382/117 |
| 6,804,378 | B2 * | 10/2004 | Rhoads | 382/100 |
| 7,120,607 | B2 * | 10/2006 | Bolle et al. | 705/64 |
| 7,389,939 | B2 * | 6/2008 | Jones et al. | 235/494 |
| 7,583,823 | B2 * | 9/2009 | Jones et al. | 382/117 |
| 2003/0173406 | A1 * | 9/2003 | Bi et al. | 235/491 |
| 2003/0183695 | A1 * | 10/2003 | Labrec et al. | 235/487 |
| 2005/0109850 | A1 * | 5/2005 | Jones | 235/487 |
| 2006/0104484 | A1 * | 5/2006 | Bolle et al. | 382/115 |
| 2006/0157559 | A1 * | 7/2006 | Levy et al. | 235/380 |
| 2007/0160308 | A1 * | 7/2007 | Jones et al. | 382/260 |
| 2009/0175508 | A1 * | 7/2009 | Connell et al. | 382/118 |
| 2009/0175513 | A1 * | 7/2009 | Bolle et al. | 382/125 |
| 2009/0252382 | A1 * | 10/2009 | Liu et al. | 382/117 |
| 2010/0014718 | A1 * | 1/2010 | Savvides et al. | 382/117 |
| 2011/0249872 | A1 * | 10/2011 | Monro | 382/117 |

OTHER PUBLICATIONS

Hao et al., Combining Crypto with Biometrics Effectively; IEEE Transactions on Computers, vol. 55, No. 9; Sep. 2006; pp. 1081-1088.
Ratha et al., Generating Cancelable Fingerprint Templates; IEEE Transactions on Pattern Analysis and Machine Intelligence; vol. 29. No. 4; Apr. 2007; pp. 561-572.

* cited by examiner

*Primary Examiner* — David Zarka
(74) *Attorney, Agent, or Firm* — Tutunjian & Bitetto, P.C.; Preston Young

(57) ABSTRACT

A system and method for generating a cancelable biometric includes shifting at least one pixel region in a biometric image comprised of pixel regions. The at least one pixel region is combined with at least one other pixel region to form a replacement region for the at least one pixel region to form a transformed image. The biometric image is reused to generate another transformed image if the transformed image is to be canceled.

22 Claims, 10 Drawing Sheets

230

REGISTRATION-FREE TRANSFORMS FOR CANCELABLE IRIS BIOMETRICS

BACKGROUND

1. Technical Field

The present invention relates to iris recognition and more particularly to systems and method for improving security of biometric features including iris scans.

2. Description of the Related Art

The iris is considered one of the most accurate biometrics. A typical iris recognition system works by enrolling irises into a secure database by segmenting the irises and extracting features for the irises. When a query (security scan) of an iris is performed, the scanned iris is also segmented and feature extracted. The features of the scanned iris are compared or matched to the secure database to determine if a match is achieved. A determination of whether the scanned iris belongs to a genuine user or an imposter is determined. Iris recognition can be seen as a general biometrics authentication system.

Like other biometrics templates (e.g., fingerprints), iris templates can be stolen or cross-matched against different databases. These privacy and security violations often restrict the use of biometrics. A first problem is that if an iris template is compromised, it is lost forever. For example, after a second eye template is lost, the user has to use some other form of biometrics other than the iris. Once compromised, the template cannot be revoked.

A second problem concerns cross matching between databases. If the same iris has been used in two databases, all the details can be linked by using the unique iris template available in both of the databases. This can be a clear violation of privacy. A person cannot generate a new iris pattern if his unique iris pattern is stolen.

The iris biometric is a strong biometric in terms of recognition performance. However, a traditional iris biometric usage scheme is weak in aspects of security and privacy. It is possible that the digital format of the iris biometric could be attacked over a network. Digital iris biometrics may be encrypted, but whenever the encryption is cracked, the iris biometric security is lost for that person. This will affect all iris biometric applications.

In addition, as the owner of a server knows the exact biometric, there is no privacy that can be afforded to that person. This owner may also use this iris biometric information to blind match with other iris biometric servers to get more personal information on a given user.

SUMMARY

Methods that can protect the genuine iris pattern, can "generate unique patterns" for different applications, and can "generate a new unique pattern" if the one being used is lost or stolen. Such methods can be adopted in the real iris biometric applications. Based on the well known binary code based iris recognition schemes, several methods are provided herein to solve the privacy issue and improve security level. The methods can be easily integrated into an existing iris recognition system where an unwrapped image and corresponding binary code are employed. A cancelable iris biometric explained herein can also be easily expanded to other segmentation formats and encoding schemes.

A system and method for generating a cancelable biometric includes shifting at least one pixel region in a biometric image comprised of pixel regions. The at least one pixel region is combined with at least one other pixel region to form a replacement region for the at least one pixel region to form a transformed image. The biometric image is reused to generate another transformed image if the transformed image is to be canceled.

A system and method for generating a cancelable biometric includes shifting at least one pixel region in a biometric image comprised of pixel regions. The at least one pixel region is combined with at least one other pixel region to form a replacement region for the at least one pixel region to form a transformed image. Shift information and combine information used to transform an enrollment are applied to a query to form a transformed query to enable matching of the transformed query to a transformed enrollment to verify an identity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
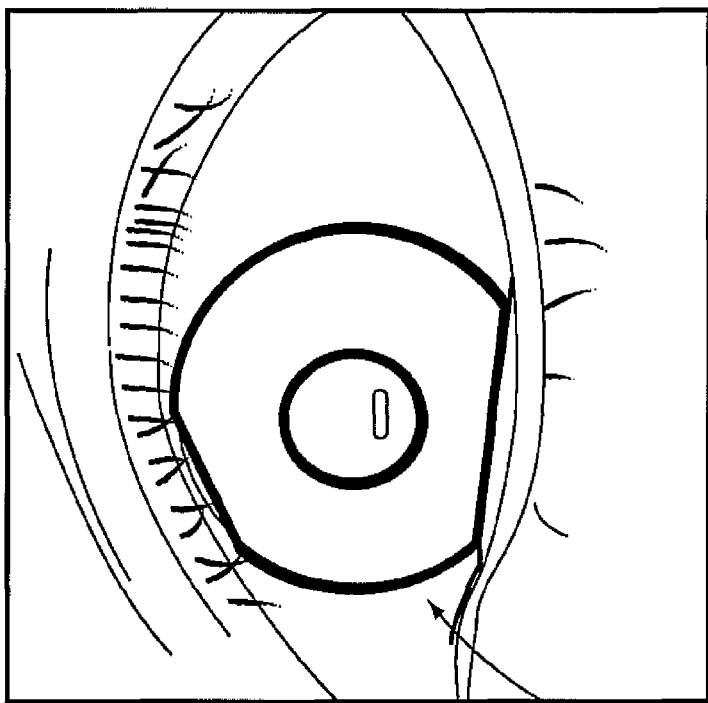
FIG. 1 depicts an iris image, a segmented iris image and an unwrapped normalized iris image.
Figure 1:
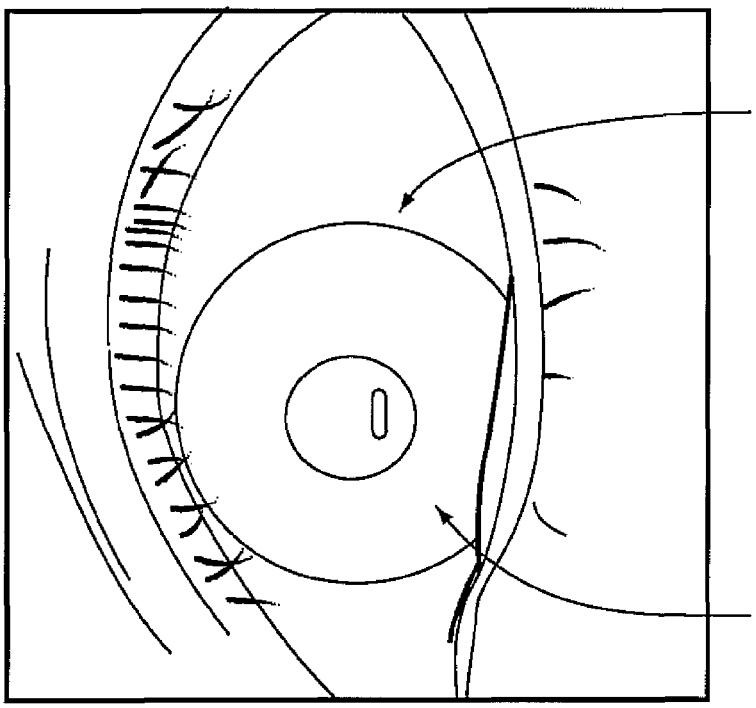
Figure 1:
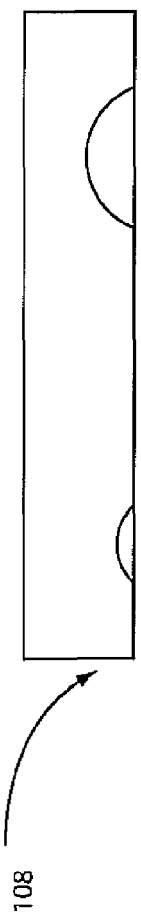

In accordance with the present principles, a cancelable iris biometric is provided. The iris image is preferably processed at a client computer of an end user, or at a secured public computer with personal data storage device accessibility. After the necessary biometrics preprocessing, such as segmentation and encoding, an unwrapped iris pattern image or iris code will pass a transform procedure to make it secure and cancelable. It is secure because an original iris pattern cannot be recovered even from a "cracked" package. The pattern is cancelable because another totally different pattern or code can be generated by the transform procedure if the former version is cracked.

Methods of repeatable image distortion are provided that allow revocability as well as prevent cross matching. These methods still permit matching when the image is transformed in a similar way. The methods are based on optional random row circular shifts in either an unwrapped iris image or an iris binary or real value code. This is followed by a combination of two or more random rows (or more generally image patches) of the unwrapped image or binary template being combined (e.g., by add, subtract, multiply, divide, XOR, etc.). Since there are many possibilities for shifting and combination patterns, the method can generate more than one version of an iris (hence it is revocable). Further, the shifting and combination information may be user selected, randomly selected, etc. Also, due to the nature of the construction, the original image cannot be recovered from the transformed version (non-invertible).

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an iris image 102 is illustratively depicted. The image 102 in this example is 384 by 384 pixels. Other resolutions or a frame of a video sequence may also be employed. In addition, the area of interest in the image 102 is a 'donut' shape 104, and grabbing pixels in this region may employ repeated rectangular-to-polar conversions. For most popular iris recognition systems, the iris region is first "unwrapped" into a rectangular region using simple trigonometry. This permits the iris decoding to address pixels in a simple normalized row-column format. The iris region is segmented to generate a segmented image 106, and the segmented iris image 106 is converted to an unwrapped iris image 108. The unwrapped image 108 is normalized and may have a resolution of 64 by 360 pixels in this example, although other resolutions may be employed.

Figure 2A:
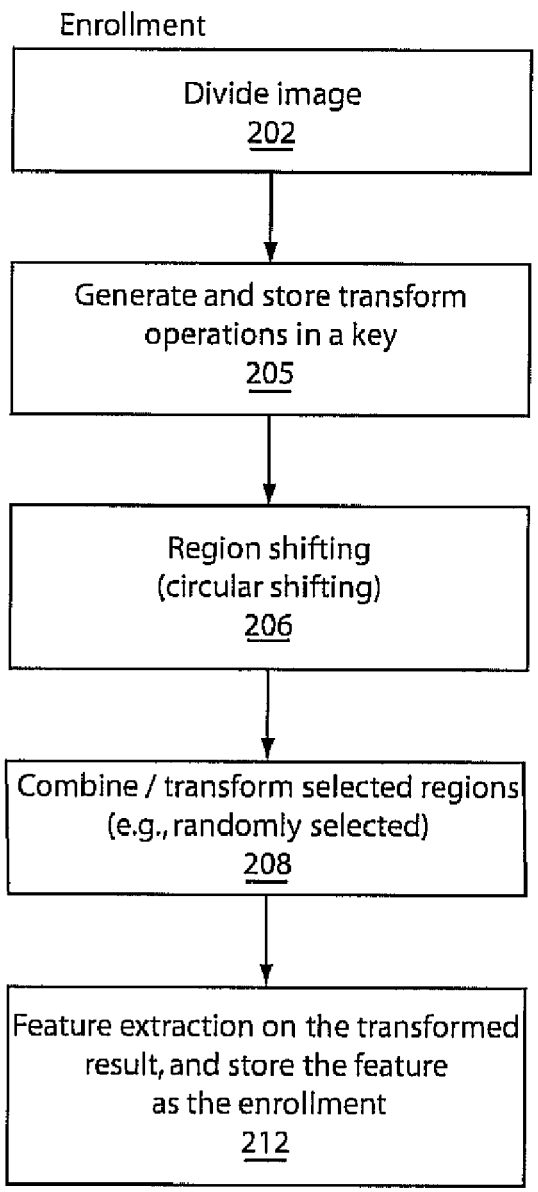
FIG. 2A is a block/flow diagram showing a system/method for generating a transformed biometric image in an image-based method including feature extraction to enable a cancelable iris biometric during the enrollment procedure.
Figure 2B:
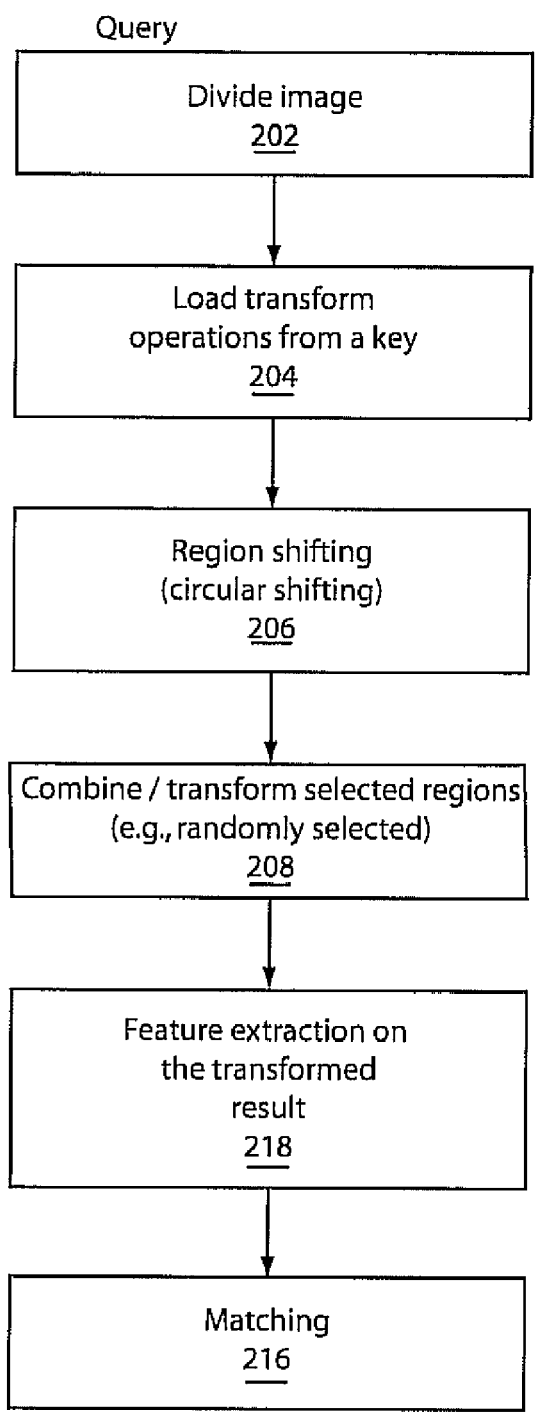
FIG. 2B is a block/flow diagram showing a system/method for generating a transformed biometric image in an image-based method including feature extraction to enable a cancelable iris biometric during the query procedure.
Figure 3:
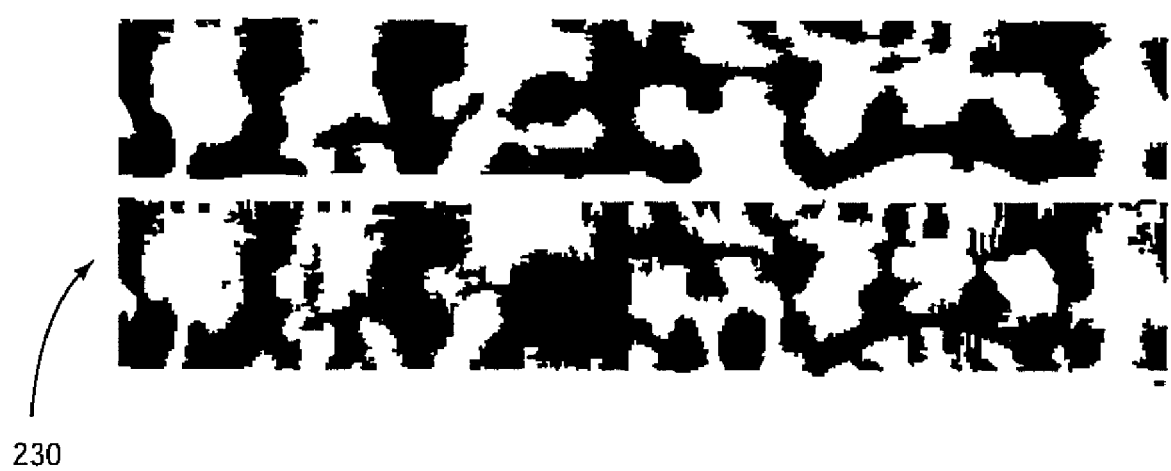
FIG. 3 is an example of a feature vector extracted from the iris image.

Referring to FIG. 2A and 2B, two block/flow diagrams show a system/method for cancelable iris biometrics in accordance with the present principles for image-based methods. After the iris is located, an occlusion, if any, caused by the eyelids and eyelashes is detected and marked in a normalized unwrapped image 108 as shown in the FIG. 1. At the end of the preprocessing step, we have a k×n unwrapped image. In block 202, the unwrapped image or the iris code of an image is divided into regions (e.g., rows).

During an enrollment procedure, in block 205 (FIG. 2A), the transform operations are selected or generated, and stored in a key. During query procedure, in block 204 (FIG. 2B), the transform operations are loaded from the key.

Figure 5:
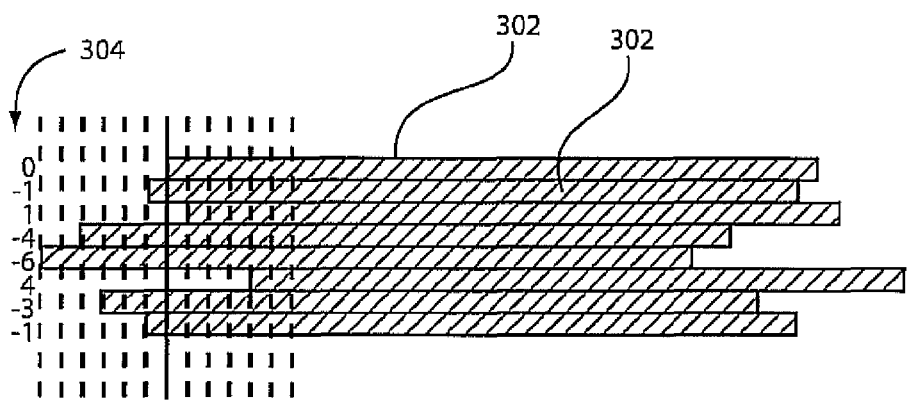
FIG. 5 depicts one or more pixel regions (rows) being shifted in a biometric image.

In block 206, region shifting is performed. In one embodiment, random row circular shifts are performed on the unwrapped iris image (108). A distortion method looks at each region (e.g., row) and randomly shifts each region (row) by m pixels as illustratively shown in FIG. 5. The shift is circular to maintain the width of image at n pixels. The circular shift means the shifted end off the edge of an image is moved to the opposite edge of the image for the shifted row. In FIG. 5, rows 302 are shifted by a number of positions as indicated by the indexes 304. The random rotation for each row is stored in a transform key. The random rotation helps to boost the key strength (i.e. the number of transforms possible).

Figure 6:
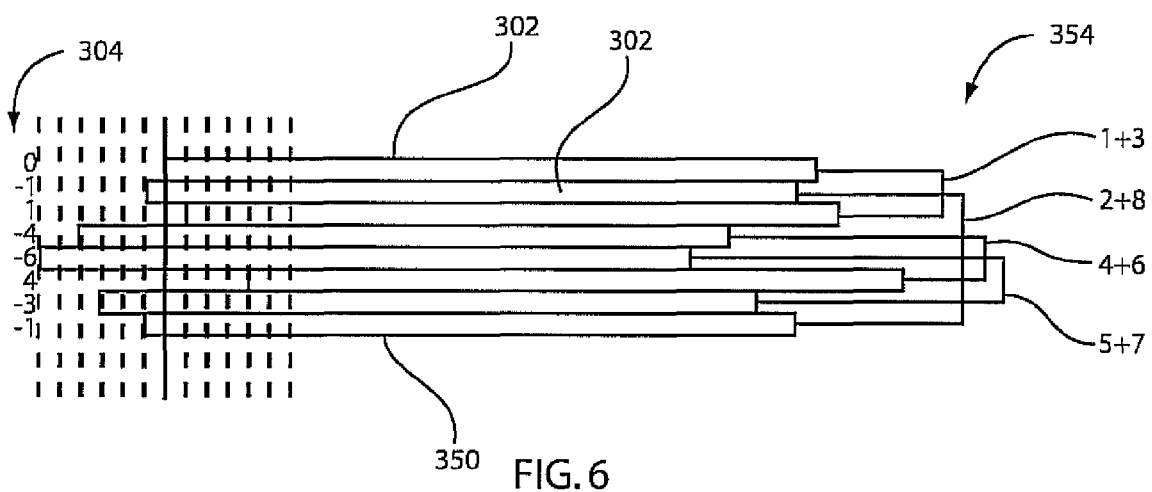
FIG. 6 depicts one or more pixel or feature regions (rows) being randomly combined and replacing a pixel or feature region in the biometric image.

In block 208, a combination of transform operations, such as add, subtract, multiply, divide, etc. are applied to two or more random regions (e.g., rows which permit registration-free alignment) of the unwrapped image (108). Since there are many possibilities for shifting and combination patterns, the method can generate more than one version of an iris (hence it is revocable). Also, due to the nature of the construction, the original image cannot be recovered from the transformed version (non-invertible). In block 209, randomly selected pairs (or more) of regions are combined (e.g., added, subtracted, etc.) to replace a region (with the combined regions). FIG. 6 shows row combinations 310 which are added. The indexes 304 are shown on the left of FIG. 6. Block 208 creates the needed non-invertibility for privacy. The information about how rows are combined is also stored in the transform key.

The operation can also be extended to subtraction, multiplication and division and more complicated mathematical functions. Similarly, a weighted sum of rows may be employed in addition to or instead of other functions. Multiple rows (i.e., even more than two) can be involved through a series of operations to generate a single row output. While the above description is based on a row-based operation, the method can work as well with rectangular or even irregular shapes chosen from the unwrapped image itself. However, if the registration-free property is desired, other transforms can be translated to a series of row shifting and row combination.

Registration-free refers to the property of not having to use registration points. Since distortion is created with the content from the iris itself, it will always occur in the same place no matter how the iris happens to be rotated. The occlusion mask also needs to be shifted and combined according to the key.

The method provides repeatable image distortion that allows revocability as well as prevents cross matching. The method also permits matching when two images of a same biometric feature (an iris) are transformed in a similar way.

During the enrollment procedure, this image will be subjected to a feature extraction, and the extracted feature will be saved as enrollment in block 212.

During a query procedure, the transformed result will pass a same feature extraction procedure in block 218 as the enrollment did, and then, the extracted feature is ready for matching with the enrollment in block 216.

Figure 4A:
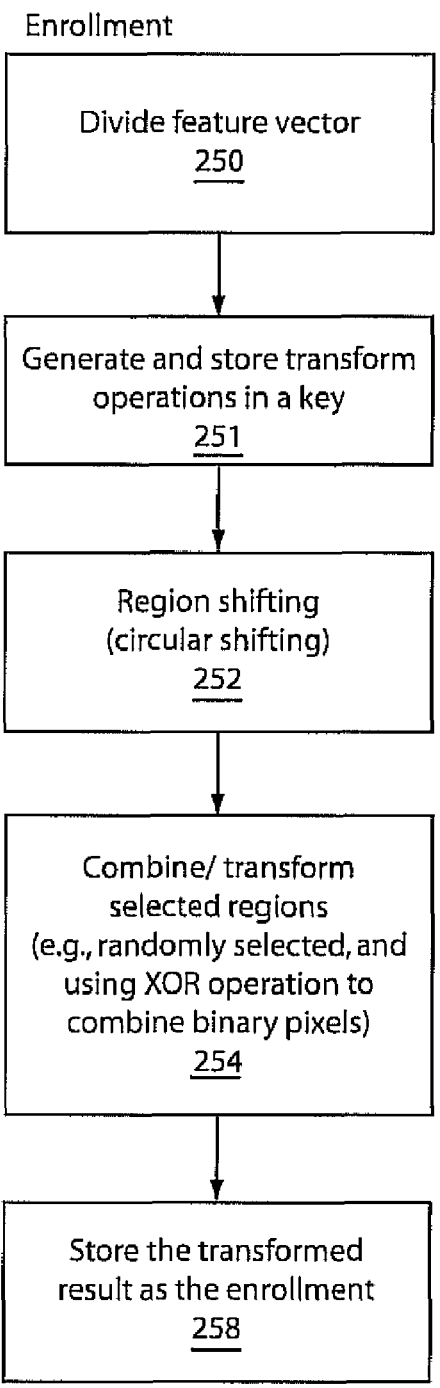
FIG. 4A is a block/flow diagram showing a system/method for transforming a feature vector to enable a feature-based cancelable iris biometric during the enrollment procedure.
Figure 4B:
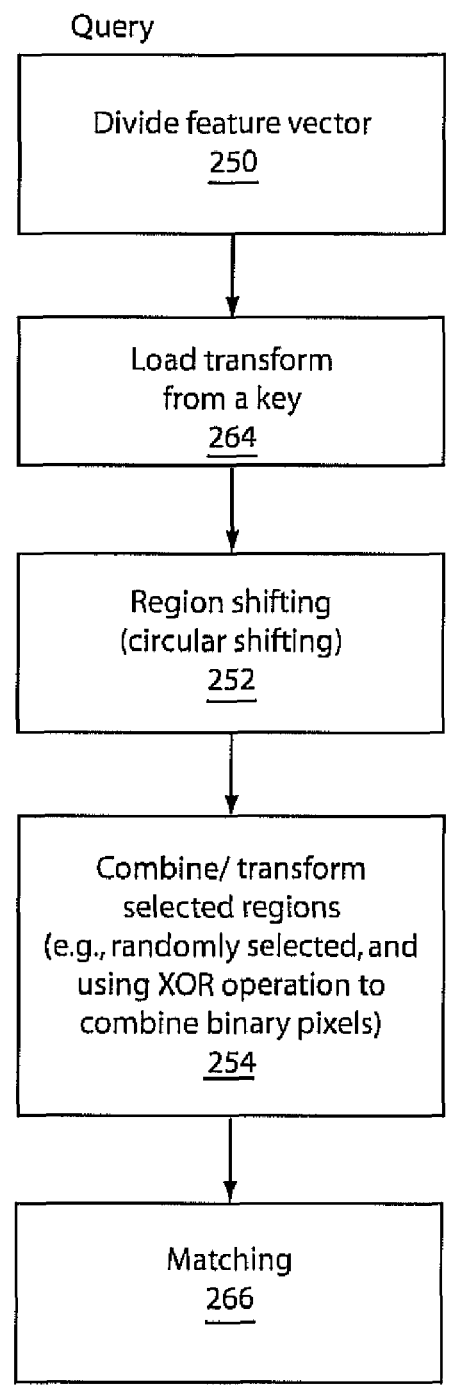
FIG. 4B is a block/flow diagram showing a system/method for transforming a feature vector to enable a feature-based cancelable iris biometric during the query procedure.

Alternatively, the same steps can be applied to a binary or real value iris template instead of an unwrapped gray scale iris image. Referring to FIG. 4A and 4B, two block/flow diagrams show a system/method for cancelable iris biometrics in accordance with the present principles for feature-based methods. In block 250, the iris code of an image is divided into regions (e.g., rows).

During an enrollment procedure, in block 251, the transform operations are selected or generated, and stored in a key.

During a query procedure, in block 264, the transform operations are loaded from the key.

Figure 7:
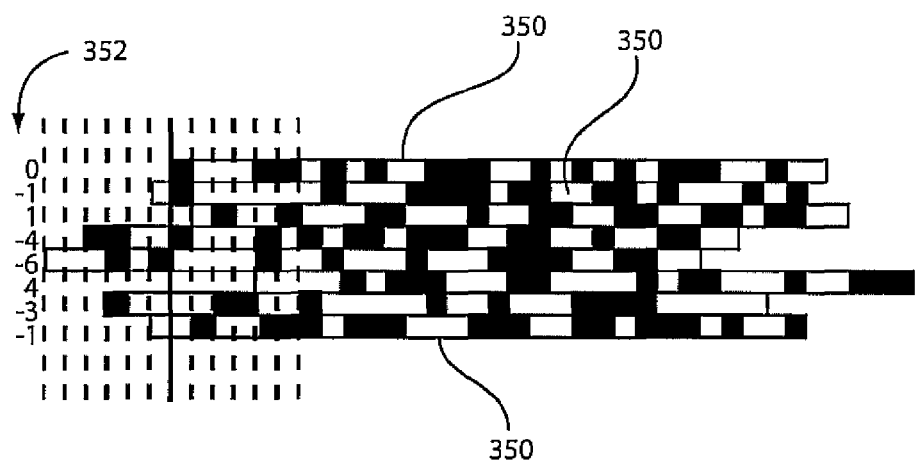
FIG. 7 depicts one or more pixel regions (rows) being shifted in a biometric bit-coded image.

In block 252, a distortion method looks at each region (e.g., row) and randomly shifts each region (row) by m pixels as illustratively shown in FIG. 7. The shift is circular to maintain the width of image at n pixels. The circular shift means the shifted end off the edge of an image is moved to the opposite edge of the image for the shifted row. In FIG. 7, rows 350 are shifted by a number of positions as indicated by the indexes 352. The random rotation for each row is stored in a transform key. The random rotation helps to boost the key strength (i.e. the number of transforms possible).

Figure 8:
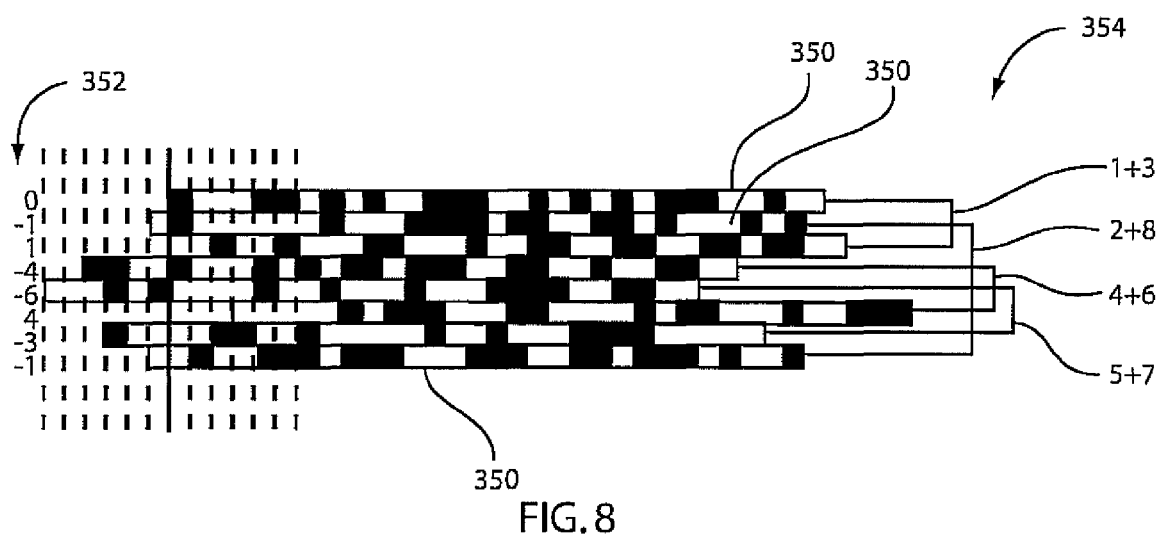
FIG. 8 depicts one or more pixel regions (rows) being randomly combined and replacing a pixel region in the biometric bit-coded image.

In block 254, randomly selected pairs (or more) of regions are combined (e.g., XORed, added, subtracted, etc.) to replace a region (with the combined regions). FIG. 8 shows row combinations 354 which are added. The indexes 352 are shown on the left of FIG. 8. Block 254 creates the needed non-invertibility for privacy. The information about how rows are combined is also stored in the transform key.

The operation can also be extended to subtraction, multiplication and division and more complicated mathematical functions, or logical functions for binary images. Similarly, a weighted sum of rows may be employed in addition to or instead of other functions. Multiple rows (i.e., even more than two) can be involved through a series of operations to generate a single row output. While the above description is based on a row-based operation, the method can work as well with rectangular or even irregular shapes chosen from the unwrapped image itself. However, if the registration-free property is desired, other transforms can be translated to a series of row shifting and row combination. Registration-free refers to the property of not to use registration points. Since the distortion is created with the content from the iris itself, it will always occur in the same place no matter how the iris happens to be rotated. An occlusion mask also needs to be shifted and combined according to the key.

The method provides repeatable image distortion that allows revocability as well as prevents cross matching. The method also permits matching when two feature vectors of a same iris are transformed in a similar way.

During an enrollment procedure, this transformed result is further saved as enrollment in block 258.

During query procedure, the transformed result is ready for the matching with the enrollment in block 266.

FIG. 7 shows cyclically shifted rows 350 in a binary iris code with indexes 352 for illustrative purposes to show the amount of a shift in each respective row.

Referring to FIG. 8, randomly selected pairs 354 of rows are 'XORed', 'XNORed' or other combination operations for real value features thereof to replace one or more rows. As before, the choice of shapes in place of rows to carry out the transformation is determined by the segmentation and unwrapping procedure. The transformed iris code is then used as a final template for enrollment or authentication. Note that XOR or other single operation is generally invertible: if you know the output and one of the inputs you can recover the other inputs. Here, however, the output is known but direct access to the inputs is not available. Hence, the use of XOR is non-invertible, thus guaranteeing privacy.

In either case, the altered image passes through the rest of the matcher (and perhaps feature extractor) with no alterations needed. The template-based approach has the advantage that the template is often accessible in commercial systems and hence it is easy to retrofit such systems. While the unwrapped image is generally less accessible, the image-based modification (as opposed to the coded iris) has the advantage that the resulting unwrapped iris can be followed by any encoding scheme, or "re-wrapped" into the original image to create a completely "new" eye image to send to the existing system.

The transforms used in cancelable biometrics should be non-invertible and revocable. The first concern is security, and the second is about the loss of identity and there can be more than one biometric application. The methods only use the information that exists inside of the biometric itself. The methods described herein use row shifting and combination on the unwrapped image or the corresponding feature vector. In a real case, more rows than depicted in FIGS. 5-8 would be employed.

In accordance with the present principles, the key generated includes the regions involved and mathematical transforms. The key is preferably generated at a user's location so that the server only has access to the transformed image. In one embodiment, the keys are not saved in a server to prevent compromising security. The user preferably has their own capture device (with the key integrated) or a smartcard where the key was saved. In all scenarios, the original iris image or feature should not be directly transferred to the server.

Figure 9A:
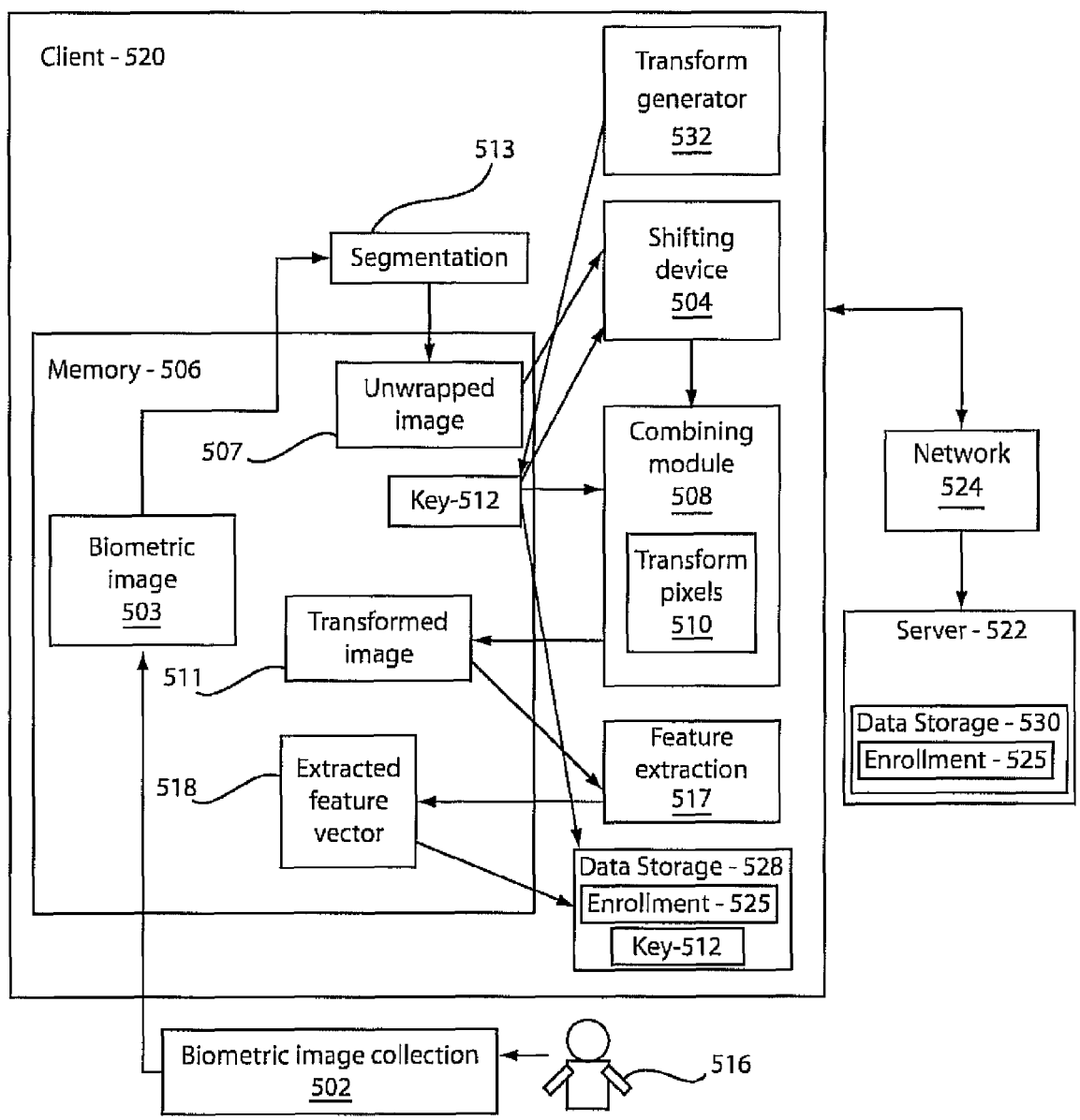
FIG. 9A is a block/flow diagram showing a system/method for enrolling to access a system using image-based cancelable biometrics in accordance with one illustrative embodiment.

Referring to FIG. 9A, a system 500 for generating and employing a cancelable biometric using gray-scale images is illustratively depicted. This is an enrollment procedure/system. A biometric image input device 502 is configured to collect a biometric image 503 from a user 516.

Figure 9B:
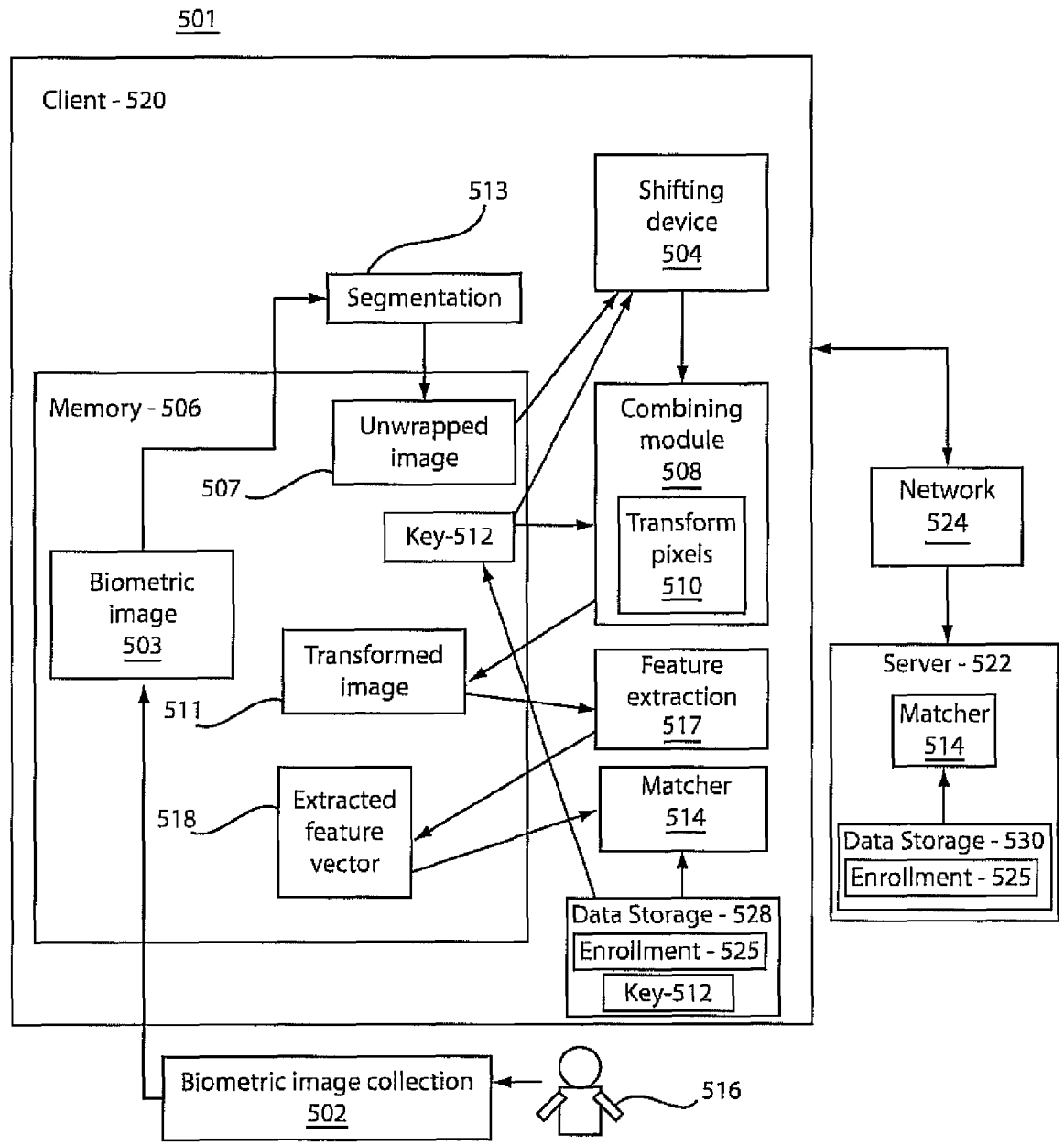
FIG. 9B is a block/flow diagram showing a system/method for querying to access a system using image-based cancelable biometrics in accordance with one illustrative embodiment.

Referring to FIG. 9B, a system 501 for generating and employing a cancelable biometric using gray-scale images is illustratively depicted. This is an enrollment procedure/system. A biometric image input device 502 is configured to collect a biometric image 503 from a user 516. A matcher will compare the query with the enrollment for a further decision.

Referring to FIGS. 9A and 9B, the biometric image input device 502 preferably includes an iris scanner although other biometric features (for example, fingerprints, facial features, etc.) may also be imaged and appropriate imaging devices employed. The image 503 may be input to a segmenter 513 which segments the image to provide an unwrapped image 507.

A shifting device 504 which may be implemented in software or in hardware (e.g., shift registers) using an image in memory 506 to apply circular shifting to the image (507). The circular shifting may include an initial shift that selects one or more rows (or columns for a rotated version) to shift. The rows and columns may be selected randomly or in accordance with another selection scheme. The shifting information comes from a key 512 generated using a transform generator 532 (FIG. 9A).

A combining module 508 is configured to select, perhaps randomly, rows or columns of pixels to combine in the unwrapped image 507 by employing a transform pixel operation 510. The transform pixel operation 510 also comes from the key 512. The key 512 is generated using transform generator 532 during enrollment and includes the shifting information from shifting device 504 (which may include a software program or hardware devices e.g., shift registers) and transform operations 510 used to combine regions of the image (e.g., rows). The key 512 is later employed to duplicate the shifting and transform operation on a query. The key 512 supplies the shifting device 504 and combining module 508 with the information on how to replicate the transformation of the enrollment on a query so that a comparison may be made.

In one embodiment, a transformed image 511 transformed by combining module 510 is processed by a feature extractor 517 to provide a feature extracted transformed image 518. The extracted feature 518 will be further saved as enrollment 525 during the enrollment procedure. The enrollment 525 will be saved in a local safe data storage device 528 or a data storage device 530 on the server 522.

The enrollment 525 is the stored version of the user's feature vector (518) from the transformed image 511. If the user attempts to access the system, the query of the user 516 is posed and the query is processed exactly as the enrollment 525. The transformed and extracted feature query is compared to the database of images to find a match. If a match is found, the user is authenticated; otherwise, access is denied.

The transform pixel operation 510 may include mathematical operations to combine pixels of the regions in the biometric image. The selected shifts and transform operations are preferably protected at a client device 520 such that if a transformed image is obtained the biometric feature (image) 503 and/or 507 remains secure. This enables the biometric feature scan to remain usable for security application even if the transformed image is stolen.

The key 512 is used to transform query presentations of user 516 for comparison (using a matcher 514) between a transformed query and the transformed enrollment image (stored in non-volatile storage device, and may be read to memory 506 before use) which are both generated using the key 512. A matcher 514 (FIG. 9B) is configured to compare a transformed query to transformed enrollment images (both generated using the key 512) to verify an identity of the user. The matcher 514 may be located at the client 520 or at the server 522 or distributed there between. The matcher 514 compares the enrollment 525 with the feature vector 518 of the query to verify a user 516.

In a server-client environment, a server 522 may be configured to receive the transformed enrollment and the transformed queries to perform matching. The server 522 is coupled to the client device 520 by a network 524, such as a satellite network, the Internet, a local area network, etc. The client device 520 securely maintains the key 512, shift information (504) and the transform operations 510 so that the key is generated and maintained only by the client 520. The server 522 (or its equivalent functioning device) never sees the biometric feature (e.g., the original iris scan) and does not know how the key was generated.

Figure 10A:
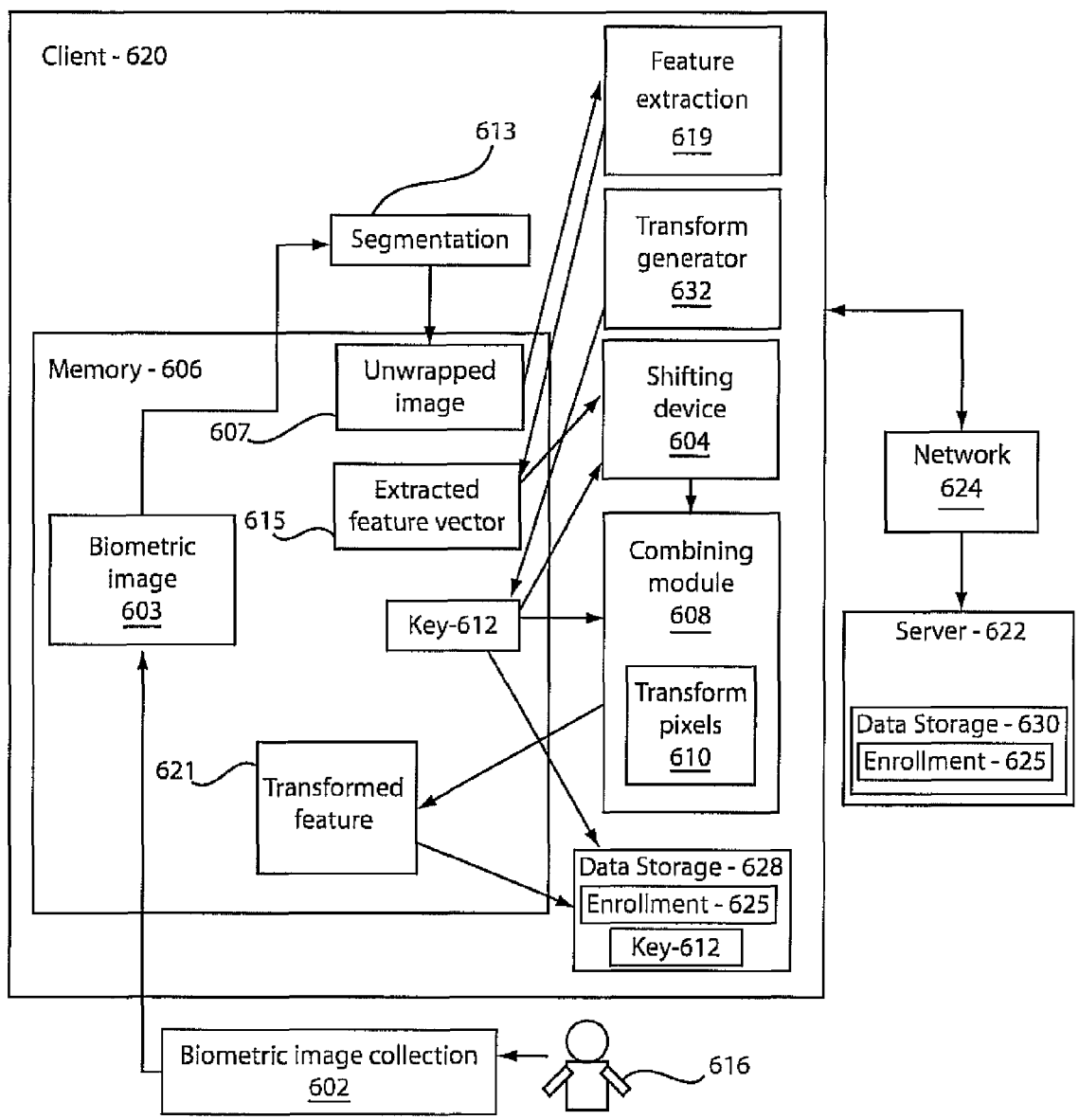
FIG. 10A is a block/flow diagram showing a system/method for enrolling to access a system using feature-based cancelable biometrics in accordance with one illustrative embodiment.

Referring to FIG. 10A, a system 600 for generating and employing a feature-based cancelable biometric is illustratively depicted for a biometrics system. This is an enrollment procedure/system. A biometric image input device 602 is configured to collect a biometric image 603 from a user 616.

Figure 10B:
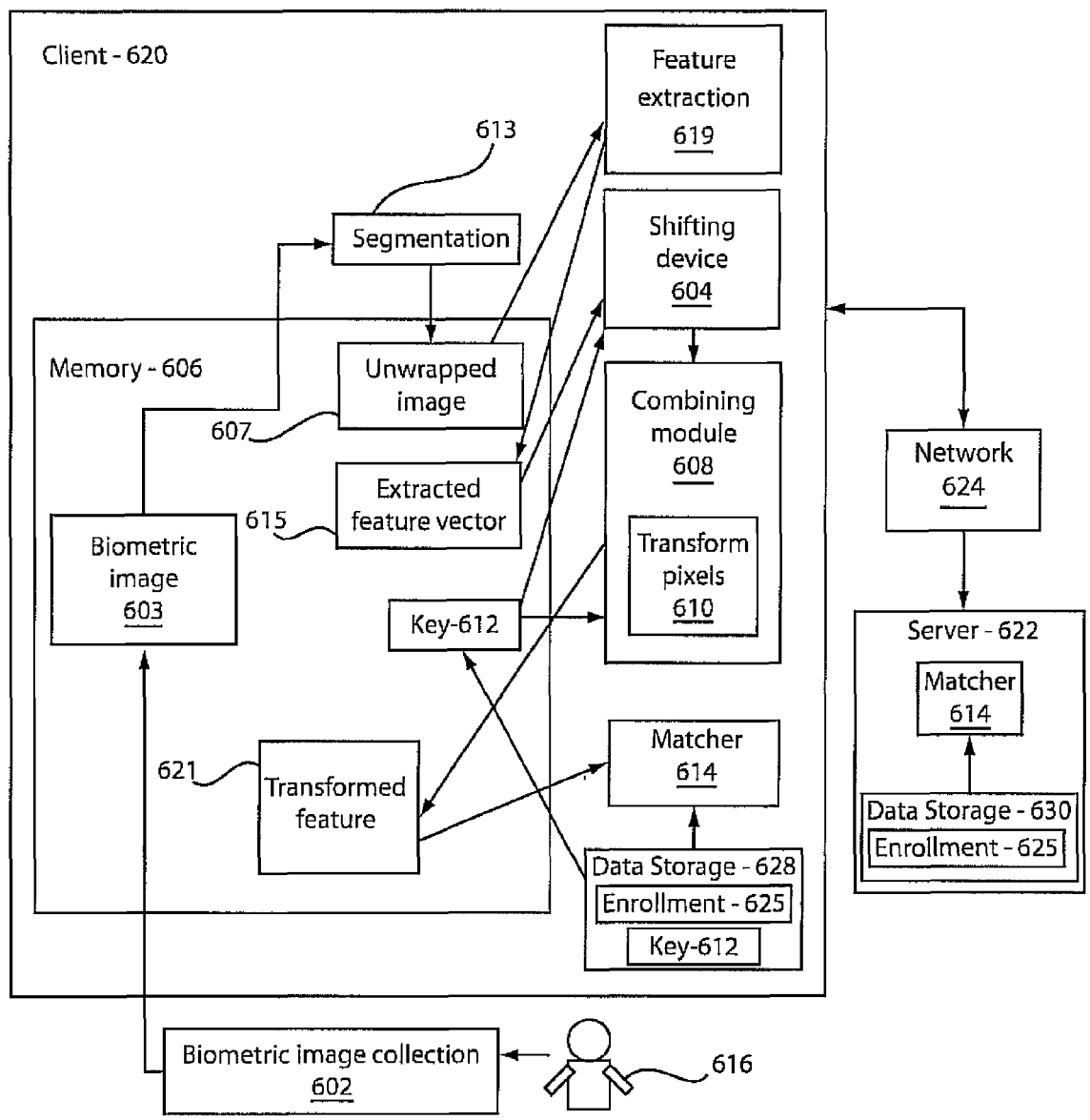
FIG. 10B is a block/flow diagram showing a system/method for querying to access a system using feature-based cancelable biometrics in accordance with one illustrative embodiment.

Referring to FIG. 10B, a system 601 for generating and employing a feature-based cancelable biometric is illustratively depicted for a biometrics system. This is a query procedure/system. A biometric image input device 602 is configured to collect a biometric image 603 from a user 616. A matcher will compare the query with the enrollment for a further decision.

Referring to FIGS. 10A and 10B, the biometric image input device 602 preferably includes an iris scanner although other biometric features (for example, fingerprints, facial features, etc.) may also be imaged and appropriate imaging devices employed. The image 603 may be input to a segmenter 613 which segments the image to provide an unwrapped image 607. The unwrapped image 607 is then sent to a feature extractor 619 which extracts features from the image and creates a feature vector 615.

A shifting device 604 which may be implemented in software or in hardware (e.g., shift registers) using an image in memory 606 applies circular shifting to the image (615). The circular shifting may include an initial shift that selects one or more rows (or columns for a rotated version) to shift. The rows and columns may be selected randomly or in accordance with another selection scheme. The shifting information comes from a key 612 generated using transform generator 632 (FIG. 10A).

A combining module 608 is configured to select, perhaps randomly, rows or columns of pixels to combine the feature vector 615 by employing a transform pixel operation 610. The transform pixel operation 610 also comes from the key 612. The key 612 is generated using transform generator 632 during enrollment and includes the shifting information from shifting device 604 (which may include a software program or hardware devices e.g., shift registers) and transform operations 610 use to combine regions of the image (e.g., rows). The key 612 is later employed to duplicate the shifting and transform operations on a query. The key 612 supplies the shifting device 604 and combining module 608 with the information on how to replicate the transformation of the enrollment on a query so that a comparison may be made. The combining module 608 outputs a transformed feature vector 621. The transformed feature 621 will be further saved as enrollment 625 during the enrollment procedure. The enrollment 625 will be saved in a local safe data storage device 628 or a data storage device 630 on a server 622.

The enrollment 625 is the stored version of the user's transformed feature vector (621). If the user attempts to access the system, the query of user 616 is posed and the query is processed exactly as the enrollment. The transformed extracted feature query is compared to the database of images to find a match. If a match is found, the user is authenticated; otherwise, access is denied.

The transform pixel operation 610 may include mathematical or logical operations to combine pixels of the regions in the biometric image. The selected shifts and transform operations are preferably protected at a client device 620 such that if a transformed image is obtained the biometric feature (image) 603, 607 and/or 615 remains secure. This enables the biometric feature scan to remain usable for security applications even if the transformed image is stolen.

The key 612 is used to transform queries 616 for comparison (using a matcher 614, FIG. 10B) between a transformed query (616) and the transformed enrollment image (stored in non-volatile storage device, can may be read to memory 606 before use) which are both generated using the key 612. The matcher 614 is configured to compare a transformed query to transformed enrollment images (both generated using the same key 612) to verify an identity of the user. The matcher 614 may be located at the client 620 or at the server 622 or distributed therebetween. The matcher 614 compares the enrollment 625 with the transformed feature vector 621 of a query to verify a user 616.

In a server-client environment, a server 622 may be configured to receive the transformed enrollment and the transformed queries to perform matching. The server 622 is coupled to the client device 620 by a network 624, such as a satellite network, the Internet, a local area network, etc. The client device 620 securely maintains the key 612, shift information (604) and the transform operations 610 so that the key is generated and maintained only by the client 620. The server 622 (or its equivalent functioning device) never sees the biometric feature (e.g., the original iris scan) and does not know how the key was generated.

This present principles can be integrated into any existing iris biometric system as a security and privacy enhancement module. In addition, it should be understood that one or more encryption schemes may be applied to the images in addition to the processing disclosed herein.

Having described preferred embodiments of a system and method registration-free transforms for cancelable iris biometrics (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for generating a cancelable biometric, comprising:
    shifting, by a processor, at least one pixel region in a biometric image comprised of pixel regions, wherein the biometric image includes one of an unwrapped iris image and a feature extracted iris image;
    combining the at least one pixel region with at least one other pixel region to form a replacement region and generate a transformed image; and
    if a new transformed image is needed, reusing the biometric image to generate the new transformed image to permit a previous transformed image to be cancelable.

2. The method in claim 1, wherein the shifting is performed in accordance with shift information, wherein the combining is performed in accordance with combine information and wherein the shift information and the combine information are user selected.

3. The method in claim 1, wherein the shifting is performed in accordance with shift information, wherein the combining is performed in accordance with combine information and wherein the shift information and the combine information are generated randomly or preselected.

4. The method as recited in claim 1, wherein the combining includes applying a mathematical operation to combine pixels of the at least one pixel region with the at least one other pixel region.

5. The method as recited in claim 1, wherein the combining includes applying a logical operation to combine binary codes of the at least one pixel region with the at least one other pixel region.

6. The method as recited in claim 1, wherein the combining includes applying a mathematic operation to combine real value features of the at least one pixel region with the at least one other pixel region.

7. The method as recited in claim 1, wherein the pixel regions of the biometric image include one or more rows, and wherein the shifting includes shifting at least one of the rows horizontally.

8. The method as recited in claim 1, wherein the shifting is performed in accordance with shift information, wherein the combining is performed in accordance with combine information and wherein the method further comprises applying the shift information and the combine information, which are used to transform an enrollment comprising the biometric image to form a transformed enrollment, on a query to generate a transformed query to enable matching of the transformed query to the transformed enrollment to verify an identity.

9. The method as recited in claim 8, further comprising granting approval of a transaction if a match exists between the transformed query and the transformed enrollment.

10. The method as recited in claim 1, wherein the shifting is performed in accordance with shift information, wherein the combining is performed in accordance with combine information and wherein the shift information and the combine information are employed to form a key and the key is protected such that, if a transformed enrollment is obtained, a biometric feature in the biometric image remains secure.

11. The method as recited in claim 1, wherein the combining is performed by selecting pixel regions randomly.

12. A computer readable storage medium comprising a computer readable program for generating a cancelable biometric, wherein the computer readable program when executed on a computer causes the computer to perform the steps of:
    shifting at least one pixel region in a biometric image comprised of pixel regions, wherein the biometric image includes one of an unwrapped iris image and a feature extracted iris image;
    combining the at least one pixel region with at least one other pixel region to form a replacement region and generate a transformed image; and
    if a new transformed image is needed, reusing the biometric image to generate the new transformed image to permit a previous transformed image to be cancelable.

13. The computer readable medium as recited in claim 12, wherein the combining includes applying a mathematical operation to combine pixels of the at least one pixel region with the at least one other pixel region.

14. The computer readable medium as recited in claim 12, wherein the combining includes applying a logical operation to combine one of binary codes and real value features of the at least one pixel region with the at least one other pixel region.

15. The computer readable medium as recited in claim 12, wherein the pixel regions of the biometric image include one or more rows, and wherein the shifting includes shifting at least one of the rows horizontally.

16. The computer readable medium as recited in claim 12, wherein the shifting is performed in accordance with shift information, wherein the combining is performed in accordance with combine information and wherein the computer readable program when executed on the computer causes the computer to further perform the step of applying the shift information and the combine information, which are used to transform an enrollment including the biometric image to form a transformed enrollment, on a query to generate a transformed query to enable matching of the transformed query to the transformed enrollment to verify an identity.

17. The computer readable medium as recited in claim 16, wherein the computer readable program when executed on the computer causes the computer to further perform the step of granting approval of a transaction if a match exists between the transformed query and the transformed enrollment.

18. The computer readable medium as recited in claim 12, wherein the shifting is performed in accordance with shift information, wherein the combining is performed in accordance with combine information and wherein the shift information and the combine information are employed to form a key and the key is protected such that, if a transformed enrollment is obtained, a biometric feature in the biometric image remains secure.

19. A system for generating a cancelable biometric, comprising:

- a biometric image input device configured to collect a biometric image from a user, wherein the biometric image includes one of an unwrapped iris image and a feature extracted iris image;
- a shifter configured to shift pixel regions in the biometric image;
- a combining module configured to combine pixels of at least one pixel region of the pixel regions with at least one other pixel region of the pixel regions;
- a transform key generated based upon shift information and combine information respectively generated by the shifter and combining module; and
- a matcher configured to match a transformed query to a transformed enrollment to verify an identity where the transformed query and the transformed enrollment are transformed by the transform key.

20. The system as recited in claim 19, wherein the transform key securely stores shift actions and combination operations to permit a reproducible biometric measure.

21. The system as recited in claim 19, wherein the combining module performs pixel combining operations for randomly selected pixel regions.

22. The system as recited in claim 19, further comprising a server including the matcher and configured to receive the transformed enrollment and the transformed query, the server being coupled to a client device, the client device securely maintaining the transform key such that the transform key is generated and maintained only by the client device.

* * * * *